United States Patent [19]

Ahn et al.

[11] Patent Number: 4,633,451

[45] Date of Patent: Dec. 30, 1986

[54] OPTICAL SERVO FOR MAGNETIC DISKS

[75] Inventors: Kie Y. Ahn, Chappaqua; Thomas H. DiStefano, Bronxville, both of N.Y.

[73] Assignee: International Business Machines Corporation, Armonk, N.Y.

[21] Appl. No.: 686,634

[22] Filed: Jan. 2, 1985

Related U.S. Application Data

[63] Continuation of Ser. No. 394,012, Jun. 30, 1982, abandoned.

[51] Int. Cl.$^4$ .................. G11B 13/04; G11B 11/10; G11B 5/58; G11B 7/08
[52] U.S. Cl. ............................ 369/14; 360/77; 360/135; 369/44; 369/275
[58] Field of Search ............ 360/75, 77, 97, 135; 369/14, 15, 18, 43–47, 275, 276; 346/76 L

[56] References Cited

U.S. PATENT DOCUMENTS

| | | | |
|---|---|---|---|
| 3,919,697 | 11/1975 | Walker | 360/77 |
| 3,941,945 | 3/1976 | Borner et al. | 369/18 |
| 4,079,169 | 3/1978 | Nigh et al. | 428/425 |
| 4,123,788 | 10/1978 | Kruger | 360/77 |
| 4,154,895 | 5/1979 | Ogawa et al. | 360/135 |
| 4,222,071 | 9/1980 | Bell et al. | 346/76 L X |
| 4,245,008 | 1/1981 | Michaelson et al. | 428/611 |
| 4,291,119 | 9/1981 | Kido et al. | 430/348 |
| 4,335,198 | 6/1982 | Hanada et al. | 430/348 |
| 4,363,116 | 12/1982 | Kleuters et al. | 360/77 X |
| 4,409,300 | 10/1983 | Ohkawa et al. | 360/135 |

FOREIGN PATENT DOCUMENTS

| | | |
|---|---|---|
| 0068801 | 1/1983 | European Pat. Off. |
| 2360957 | 1/1977 | France |
| 2315142 | 3/1978 | France |
| 54-73610 | 6/1979 | Japan ........................ 360/77 |
| 56-105344 | 8/1981 | Japan ........................ 369/14 |
| 56-169238 | 12/1981 | Japan ........................ 369/14 |

OTHER PUBLICATIONS

IBM TDB, vol. 16, No. 4 "Optical Servo Information on Magnetic Recording Medium" Schneider, Sep. 1973, p. 1082.
IBM TDB, vol. 21, No. 10, "Floppy Disc Embossing for Servo Applications" Acosta et al., Mar. 1979, pp. 4259–4260.
IBM TDB, vol. 19, No. 9 "Optical or Capacitive Digital Servos for Record Members" Cannon, 2/77, pp. 3303–3304.
IBM TDB, vol. 23, No. 7B "Optical Storage of Data on a Magnetic Medium" Laming et al., 12/80, p. 3319.
IBM TDB, vol. 22, No. 3, "Video Disk with Updating Feature" Bruce et al., 8/79, p. 1183.
IEEE Trans. on Magnetics, vol. Mag-16, No. 5 "Optical Method of Head Positioning in Magnetic Disk Systems" Koshino et al. 9/80, pp. 631–633.
"Laser Interferometry Technique for Track-Following Servo control of DASD Head Location"–M. D. Levenson Aug. 1982, pp. 1103–1107 IBM TDB, vol. 25, No. 3A.
"Floppy Disc Embossing for Servo Applications"—R. E. Acosta et al., Mar. 1979, pp. 4259–4260 IBM TDB, vol. 21, No. 10.
"Optical Servo of Magnetic Recording—A. S. Hoagland Mar. '78, pp. 4108–4109, IBM TDB, vol. 20, No. 10.
"Optical Servo Information on Magnetic Recording Disks"—J. Schneider Sep. 1973, p. 1082.

*Primary Examiner*—Donald McElheny, Jr.
*Assistant Examiner*—Steven R. Garland
*Attorney, Agent, or Firm*—Graham S. Jones, II

[57] ABSTRACT

The surface of a magnetic recording disk is encoded with optically sensed indicia, which is employed to control track following of the read/write slider head along a track on a magnetic recording medium such as a disk. The means of reading the medium is to employ a laser carried by the slider which cooperates with the medium as a reflector which affects the lasing function or modulates the operating characteristics of the laser diode. The retro-reflected light changes the operating voltage of the diode. Preferably, the disk is coated with a multiple layer optical recording medium deposited upon the upper surface of the magnetic recording medium.

8 Claims, 25 Drawing Figures

FIG. 5.1
FIG. 5.2
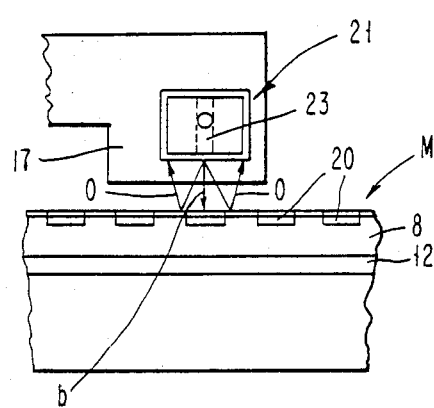
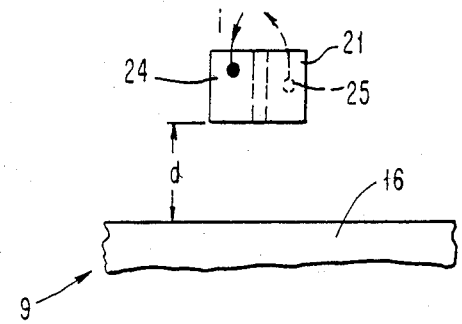
FIG. 5.3
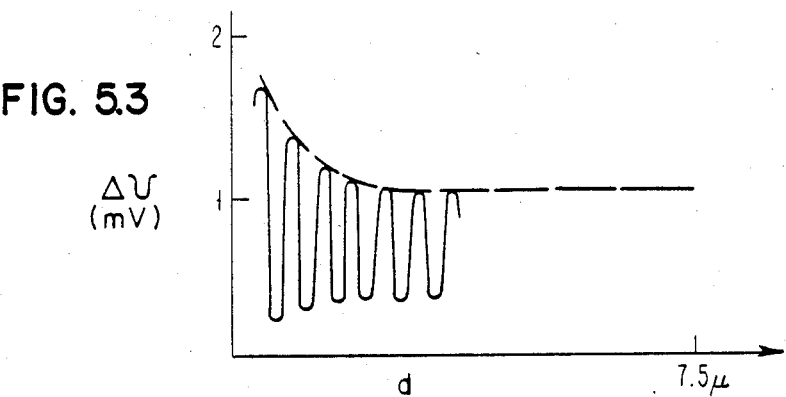
FIG. 5.4
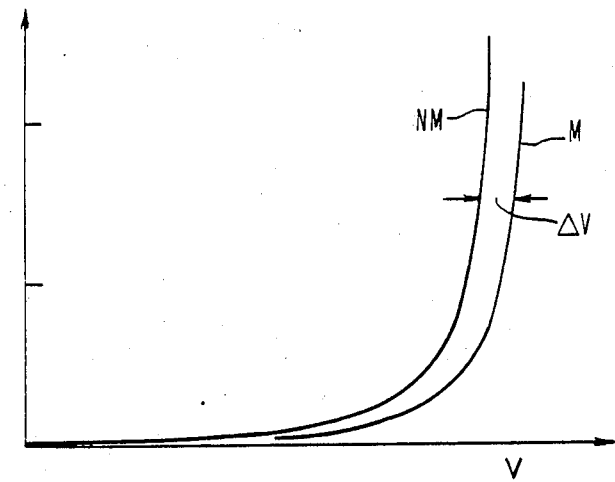

FIG. 6.1
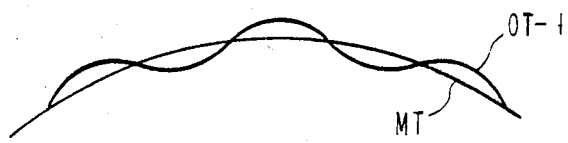
FIG. 6.2
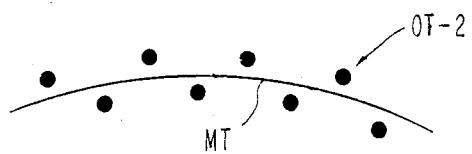
FIG. 6.3
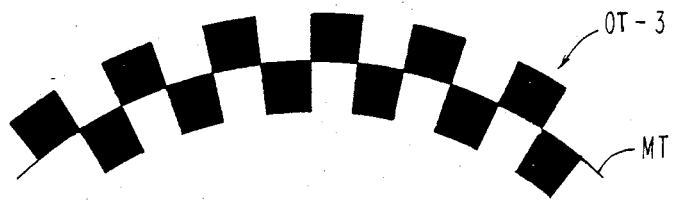

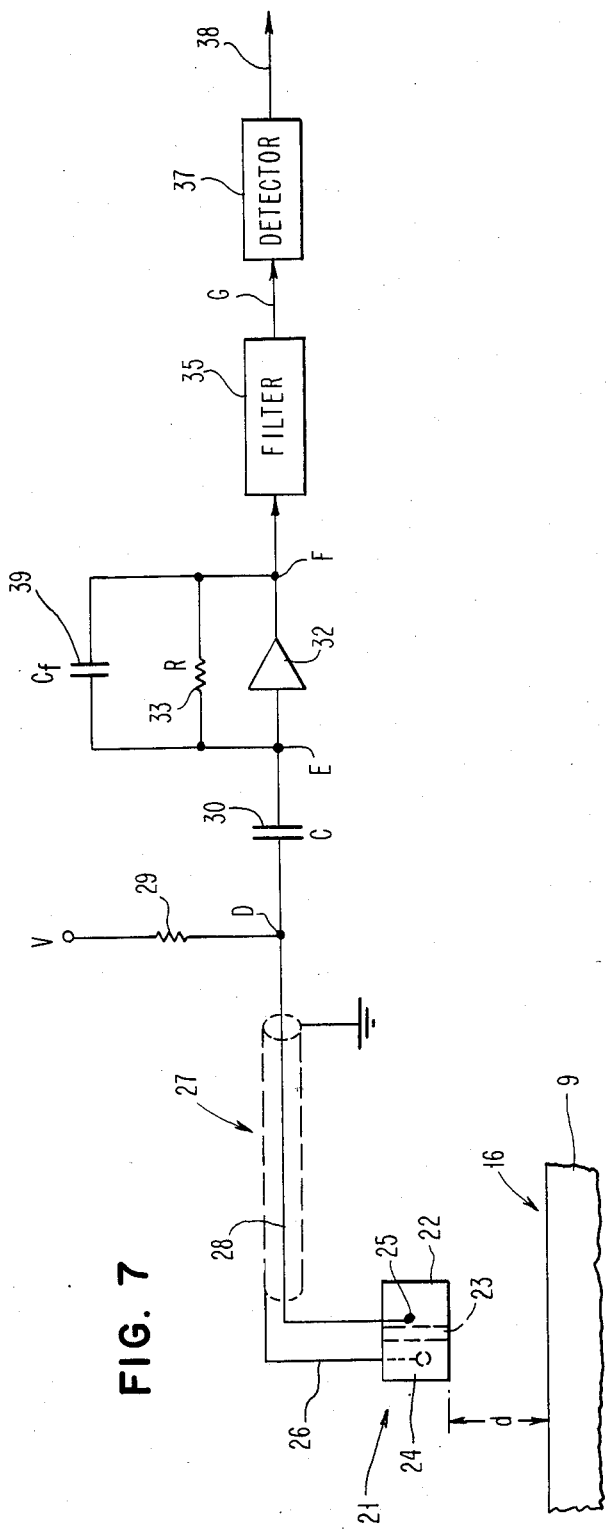
FIG. 7
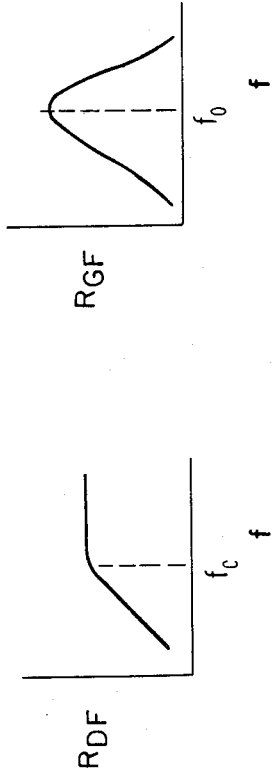
FIG. 8
FIG. 9

FIG. 10.1
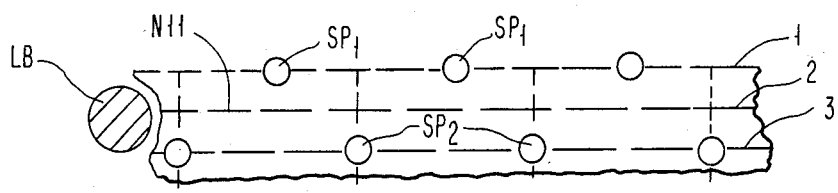
FIG. 10.2
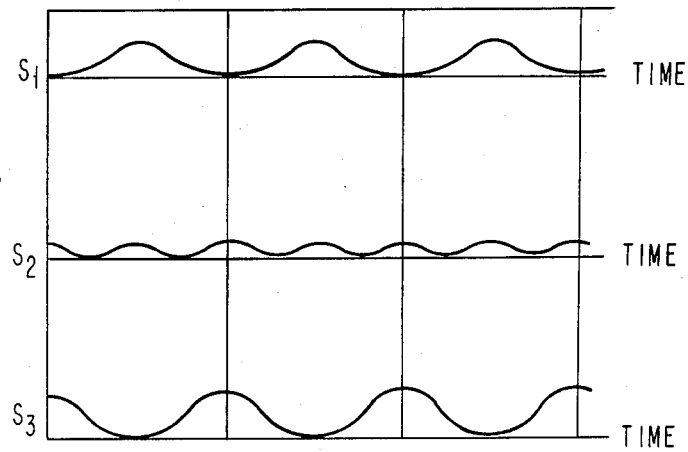
FIG. 11
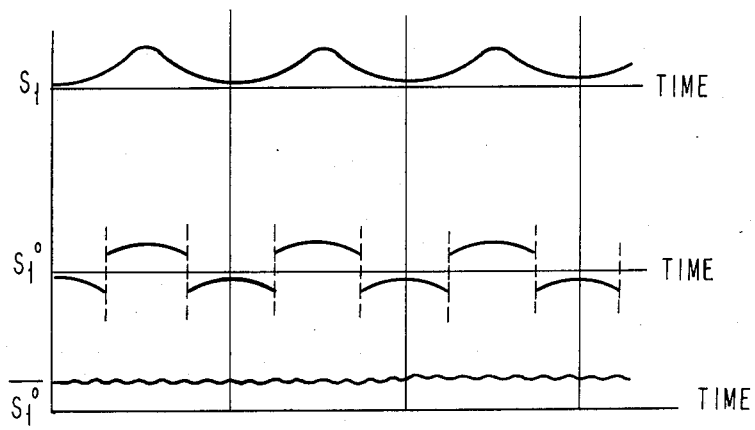
FIG. 12
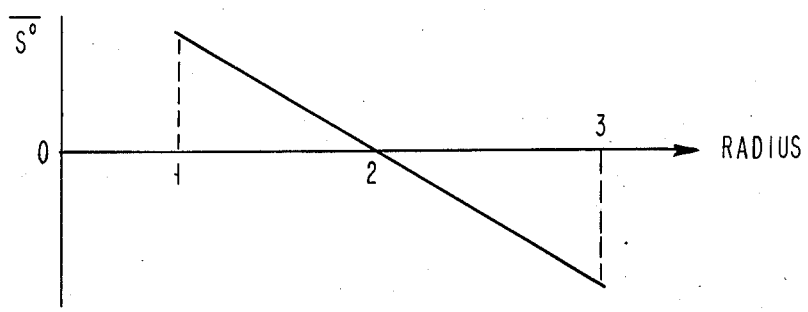

FIG. 13.1
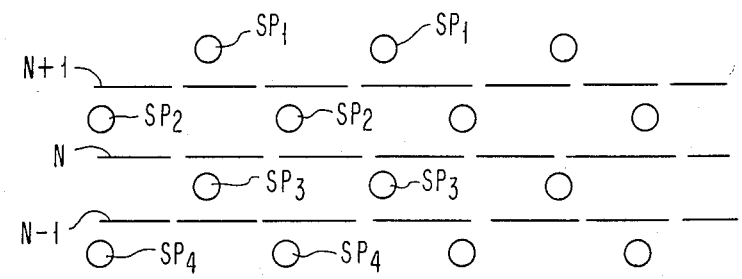
FIG. 13.2
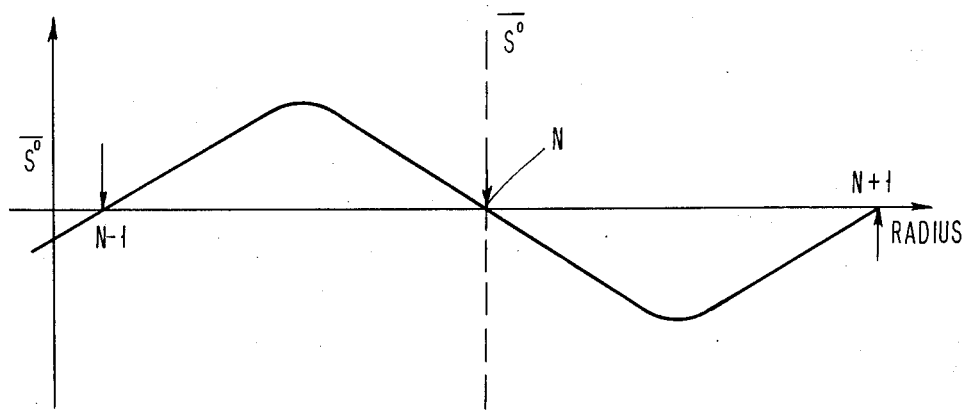

FIG. 14.1
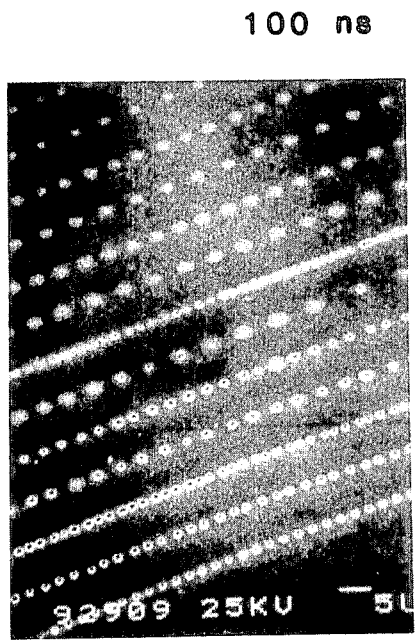
FIG. 14.2
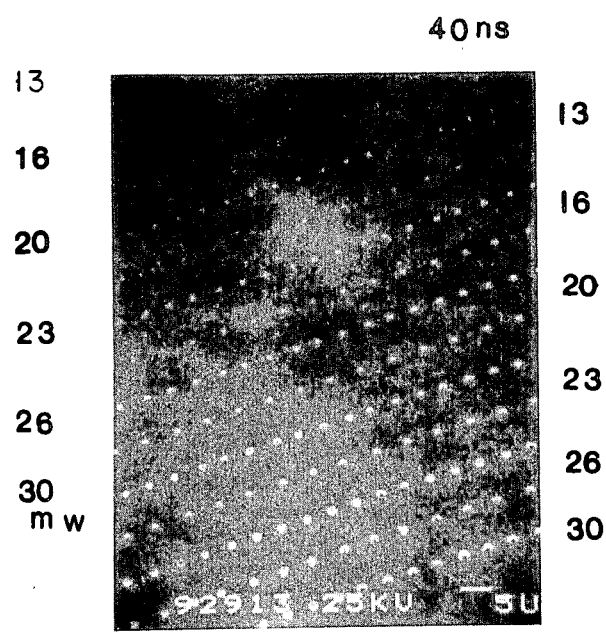

FIG. 15
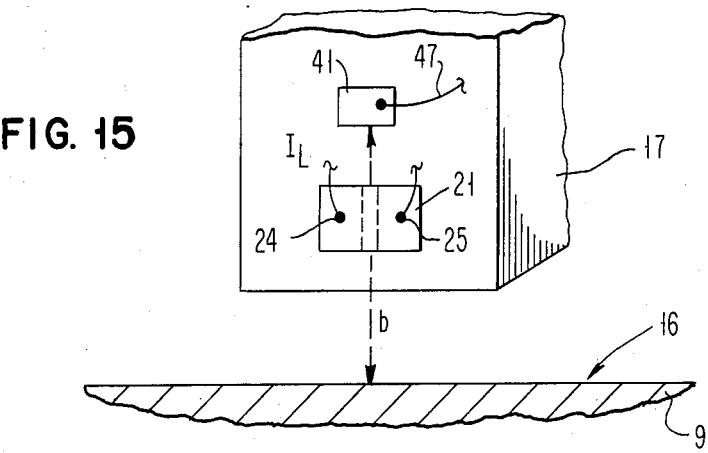
FIG. 16.1
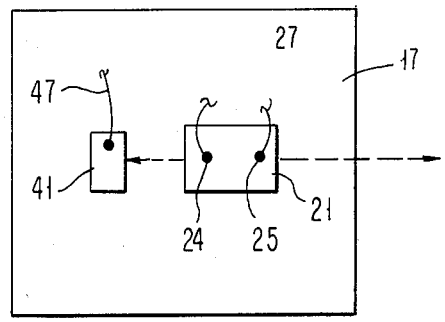
FIG. 16.2
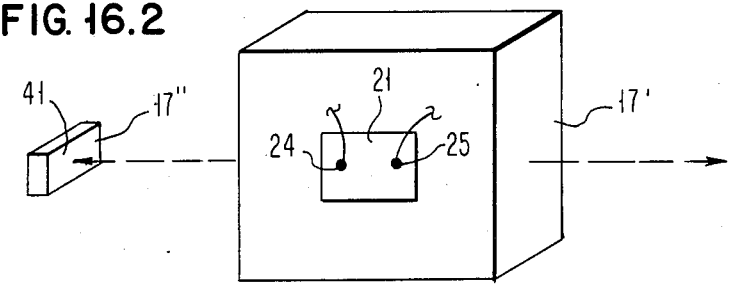

OPTICAL SERVO FOR MAGNETIC DISKS

Priority is claimed under 35 U.S.C. 120 based upon a parent application. This application is a continuation of U.S. patent application Ser. No. 06/394,012 filed June 30, 1982, now abandoned.

BACKGROUND OF THE INVENTION

1. Technical Field

This invention relates to magnetic recording media and servo systems for magnetic recording heads and more particularly to magnetic recording disks including optical servo information on the disks and control systems for positioning magnetic read/write heads cooperating therewith.

2. Background Art

Schneider, "Optical Servo Information on Magnetic Recording Disks," IBM Technical Disclosure Bulletin, 16 No. 4, 1082 (Sept. 1973), shows a slider carrying a pair of lasers and detectors which sense cams 9 that form a track on the magnetic disk.

Koshino et al "Optical Method of Head Positioning in Magnetic Disk Systems," IEEE Trans. on Magnetics, MAG-16 No. 5, 631–633 (Sept. 1980), shows an aluminum substrate covered with tracks of black colored dye. The magnetic coated film is carried on top of the substrate containing alternating colored and noncolored layers. It is required for optical fibers to connect the LED on the arm with the head core on the slider.

Kruger, U.S. Pat. No. 4,123,788 for "Magnetic Information Carrier with Optical Servo Tracks and Apparatus for Reading and Writing the Same" shows a medium with optical servo tracks in which the magnetic recording medium is deposited upon a reflective layer so that when a laser beam burns away the magnetic layer, a reflective pattern is formed permitting servo information to be read. Kruger uses an optical fiber sensor using an LED and photodiodes. There were tracks of black dye placed upon the substrate. Alternatively, the servo data can be added by photolithography.

Acosta et al, "Floppy Disk Embossing for Servo Applications," IBM Technical Disclosure Bulletin, 21, pp. 4259–60, (March 1979), describes mechanical tracks embossed in a disk.

DISCLOSURE OF THE INVENTION

An object of this invention is to provide magnetic disks with improved optical servo indicia thereon.

Another object of this invention is to provide an improved system for detecting servo information on magnetic recording media.

Still another object of this invention is to provide an optical servo system for magnetic recording disks combining virtures of simplicity and economy.

A further object of this invention is to provide optically readable servo data on magnetic recording media, without using any of the magnetic recording surface area for the servo information to the exclusion of the magnetic recording use in that area, by employing superposition of the magnetic and optical systems.

In a system for writing and reading a magnetic recording disk carrying a layer of magnetic material and including a servo track layer that is encoded with servo information which is to be read optically the improvement comprising, a laser apparatus carried by said slider which cooperates with said medium with the optical characteristics of the medium for detecting said servo information by modulating the operation of said laser as a function of said reflectivity.

BRIEF DESCRIPTION OF THE DRAWINGS

FIG. 5.1 shows a sectional view of a slider carrying the optical head of FIG. 4 above the upper surface of the magnetic recording medium of FIG. 1 with optically recorded servo spots indicated on the upper surface of the disk.

FIG. 5.2 shows the semiconductor diode injection laser of FIG. 5.1 in a schematic relationship with the surface of the magnetic recording medium of FIG. 1.

FIG. 5.3 shows a graph of voltage fluctuations across the leads of the laser diode of FIG. 5.1 as a function of spacing distance from the magnetic recording disk of FIGS. 5.1 and 5.2.

FIG. 5.4 shows a graph of the current-voltage relationships for the diode of FIGS. 4, 5.1 and 5.2 for the presence of a mirroring surface beneath the diode which creates optical feedback of retro-reflective light and for the absence of such a mirroring surface.

FIGS. 6.1–6.3 show a set of optical tracks on the surface of the storage disk of FIG. 1 which provide dark surfaces on opposite sides of the magnetic track to be read by a magnetic recording head. The dark areas modulate the light retroreflected to the laser diode in the optical head reading the servo track indicating where the head is located along the disk.

FIG. 7 shows a circuit for decoding the signals received by the laser of FIGS. 4 and 5.1–5.4 from a track such as FIGS. 6.1–6.3.

FIG. 8 shows a graph of the frequency response of the roll off amplifier between points D and F in FIG. 7.

FIG. 9 is a graph of the frequency response of a narrow pass band filter. The filter 35 passed the detected servo signal around frequency $f_o$.

FIG. 10.1 shows optical tracks of the kind shown in FIG. 6.2 straightened for convenience of illustration with three tracks of the laser beam drawn along the track indicating three particular tracks the optical beam LB might trace along the optical track.

FIG. 10.2 shows the values of the response signal $S_n$ for the configuration in FIG. 10.1, for the tracks n=1, 2, or 3 as a function of time as the laser beam LB moves relative to the spots $SP_1$ and $SP_2$.

FIG. 11 shows the response signal of track 1 in FIG. 10.1 and 10.2 compared with the output of the phase sensitive detector ($S°_1$) and the average output of the phase sensitive detector $\overline{S°}_1$.

FIG. 12 shows the average output $\overline{S°}$ shown in part in FIG. 11 as a function of positions from track position 1 to track position 3 in FIG. 10.1.

FIG. 13.1 shows a set of tracks N−1, N and N+1 similar to the one in FIG. 10.1 showing how adjacent tracks are staggered with respect to the spots $SP_n$. Note that the tracks are also straightened out for convenience of illustration.

FIG. 13.2 shows how $\overline{S^\circ}$ reverses from track center to track center with tracks N−1, N and N+1 illustrated. The slope alternates with even and odd tracks.

FIGS. 14.1 and 14.2 show parallel tracks made of the types of spots shown in FIGS. 14.1–14.3 for 100 ns and 40 ns exposures of 13, 16, 20, 23, 26, and 30 mw laser beams.

FIG. 15 shows the optical sensor configuration of a semiconductor diode injection laser oriented above the reflecting storage surface, with an optical detector oriented to collect the light emitted from the rear facet of the laser.

FIG. 16.1 shows a representation of a pair of elements in accordance with FIG. 15 with the laser element and the sensor juxtaposed on a single chip.

FIG. 16.2 shows the laser element and the sensor located on separate chips which are juxtaposed on the substrate which carries the two chips in an arrangement with functional equivalence to the embodiment of FIG. 16.1.

DESCRIPTION OF THE PREFERRED EMBODIMENT

Figure 1:
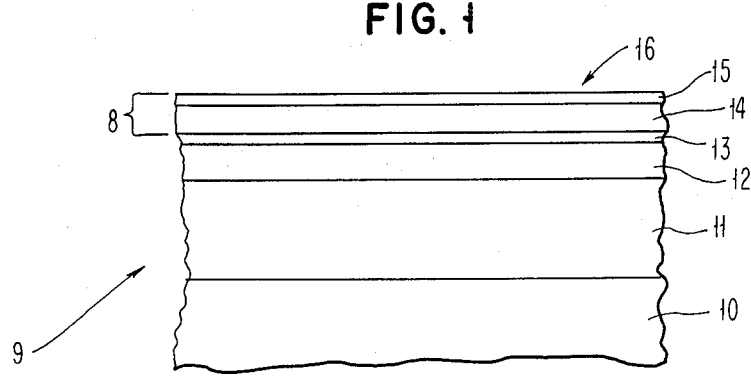
FIG. 1 is a schematic elevational view of a magnetic recording disk with an optical storage servo tracking layer on the upper surface thereof in accordance with this invention.

FIG. 1 shows a magnetic recording disk 9 embodying this invention. Substrate 10 is a nonmagnetic material composed preferably of an aluminum alloy which is coated with a clad layer 11 having a surface 16 as smooth as possible and which is preferably composed of a nonmagnetic corrosion resistant material alloy such as stainless steel to provide a durable record carrier adapted to protect the aluminum substrate from corrosion. A preferred clad layer is a cobaltbased alloy discussed in U.S. Pat. No. 4,079,169 which is commonly assigned, or other materials discussed in U.S. Pat. No. 4,079,169.

A preferred magnetic recording layer 12 is composed of iron, cobalt and chromium in accordance with U.S. Pat. No. 4,245,008. A thin film 13 of chromium provides an adhesion layer about 10–20 nm thick. A thin film of a hard overcoat layer 14 serves the purpose of protecting the magnetic layer 12 from wear during starting and stopping when the head occasionally loses its flying characteristics and comes into momentary contact with the magnetic recording medium as stated in U.S. Pat. No. 4,245,008. In accordance with this invention, the top layer 15 is composed of a material such as silicon about 20–40 nm thick. Layers 14 and 15 form a sandwich 8. When the upper layers 8 (14 and 15) are exposed to a laser beam, they form marks which are optically visible as explained in U.S. patent application Ser. No. 276,283 of Tu et al for "Silicon Laminated Media for Archival Storage" which pertains specifically to films of silicon on metal films such as Rh, Pt, Pd, etc., whereas this example suggests that the top layer 15 be comprised of silicon in the amorphous form in the preferred embodiment. The thickness of layer 15 of amorphous silicon or the like is selected so that the reflectivity of the surface of the disk at the wavelength of the laser beam is significantly different from the reflectivity of the array of marks used as servo indicia on the surface 16 of magnetic recording disk 9.

Figure 2:
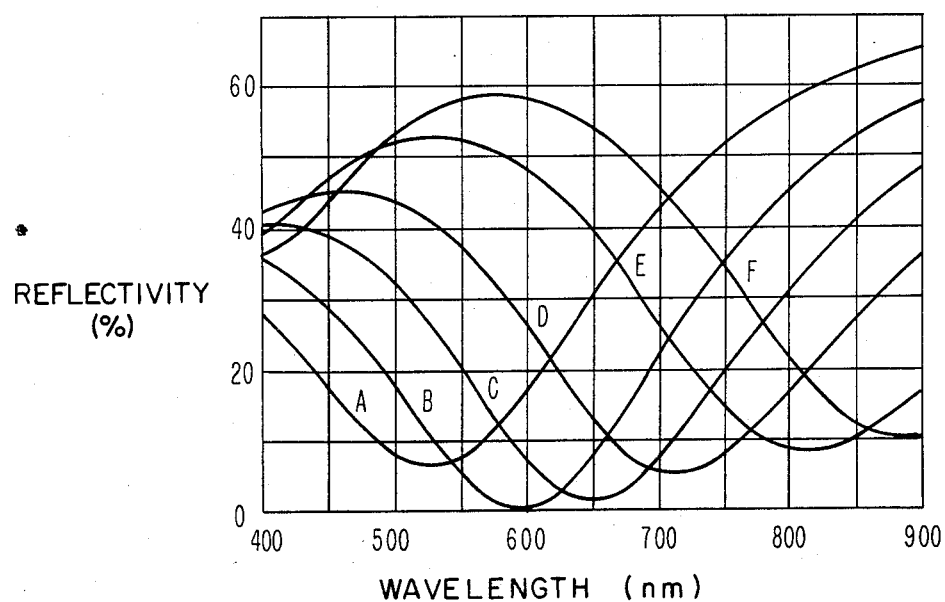
FIG. 2 is a graph of reflectivity percentage of bilayers of Rh and Si as a function of wavelength for six different thicknesses of the upper amorphous silicon layer employed to form the optically readable servo tracking information on the upper surface of the magnetic recording disk of FIG. 1.

FIG. 2 shows typical percent of reflectivity characteristics of an Rh/Si bilayer structure. The Rh film 14 is 25 nm thick, and the Si layer 15 increased in thickness from 15 nm for curve A to 40 nm for curve F in 5 nm increments. Clearly the thickness of the silicon film 15 can be selected for minimum reflection at the wavelength of the laser light if desired. For example, curve B gives a value of 0% reflectivity for a wavelength of 600 nm. At a wavelength of 820 nm, (which is the output wavelength of $Ga_xAl_{1-x}As$ laser diodes) the curve selected is curve E which gives a reflectivity of 8%.

The indicia forming the servo track pattern are formed on the multilayer film by laser heating the structure to cause a reaction or interdiffusion to occur between the materials of films 14 and 15. For the case of a Si layer on Rh, the laser written spots react to form $Rh_2Si$, with an optical reflectivity of approximately 50%. The optical reflectivity change between the laser written indicia and the background is about 42%, an easily detectable contrast.

Figure 3:
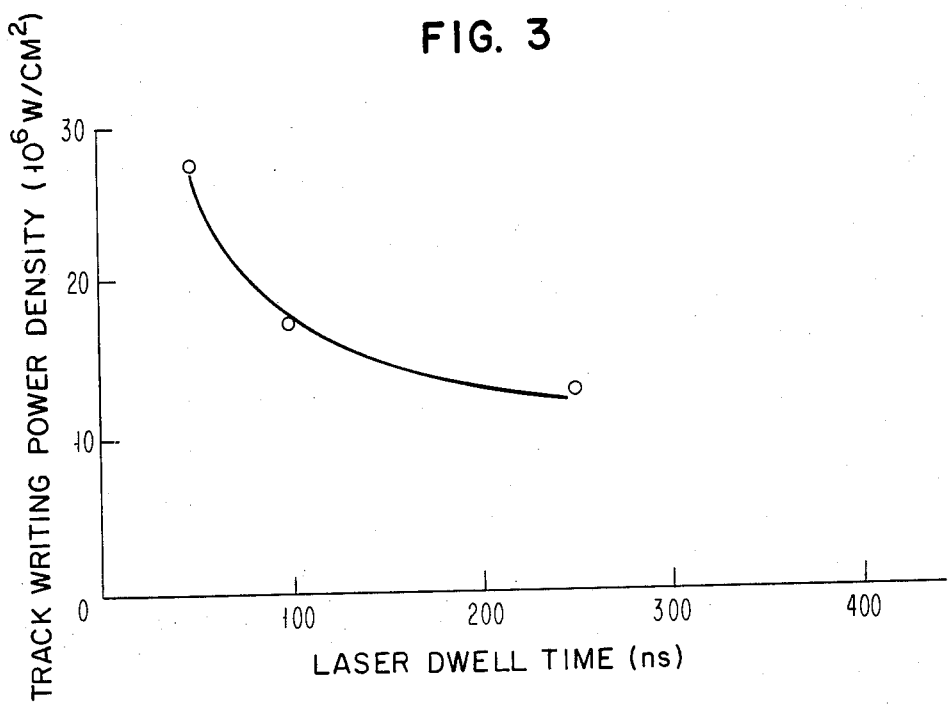
FIG. 3 is a graph of laser power versus laser pulse width required to write servo information onto the Rh-Si bilayer of FIG. 1.

FIG. 3 shows typical power levels of the laser beam used to write bits of data in the form of one micrometer diameter spots on a Rh/Si bilayer structure with a film 10 of 30 nm thick Rh onto which is coated 30 nm of Si for use in optical storage. For optical servo applications, larger arrays of spots or patterns are written to form servo tracks.

There are several methods of preparing the servo tracks. Preferably, they are laser reacted as described above, but they can be laser ablated, contact printed, embossed, and formed by lithographic techniques employing exposure of photoresist films.

Figure 4:
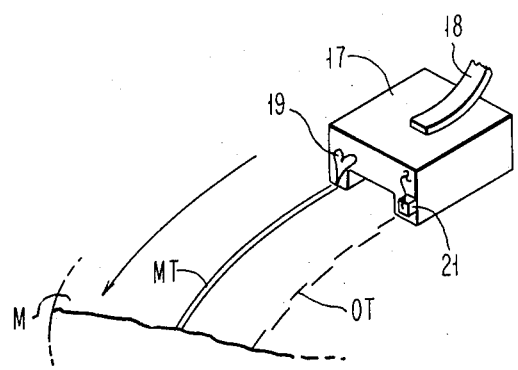
FIG. 4 shows a magnetic recording head and a laser diode track reading head using optical feedback in accordance with this invention.

FIG. 4 shows a magnetic recording medium M with a magnetic recording track MT and an optical servo track OT. A slider 17 adapted for aerodynamic suspension over the rotating medium M carries a magnetic recording transducer 19 and an optical transducer 21 adapted to read the track OT while transducer head 19 is writing or reading track MT. The slider 17 is supported by element 18 which is carried by a servo motor system of the variety employed in magnetic recording disk systems, to position the slider radially on the disk surface. FIG. 5.1 shows a medium M in accordance with FIG. 1 with the magnetic recording material 12 and the optical recording layers 8. Spots 20 on the surface of layers 8 are employed to modulate optical feedback to a laser diode 21. Diode 21 will produce different operating characteristics when light is fed back which can be employed in this invention to detect the optically readable indicia on the disk by producing fluctuations in voltage at predetermined frequencies to indicate whether the head is on track or off track. FIG. 5.1 shows direct beams b from the channel 23 of the diode 21 which reflect back into the channel of diode 21 to produce variations in the voltage of the diode. Light from the diode 21 which is directed outwardly (0) will reflect away from the channel 23 so it is not effective to modify the output of diode 21. As a result, the spatial resolution of the detector is considerably higher than the size of the illuminated spot on the disk surface. That is, only the light reflected back from the region near the center of the illuminated spot will be reflected back to the active region of the laser where it is detected. The servo track on a magnetic recording disk 9, which is composed of a magnetic recording medium M that is either thin film alloy or particulate, is read out by using the retro-reflected light from the surface 16 of the disk 9 to modulate the operating characteristics of a laser diode 21 in FIGS. 4 and 5.1. For example, the diode 21 can be excited by a constant current source and variations in the voltage across the diode are monitored and detected. The retro-reflected light changes the operating voltage of the diode 21, depending upon the reflectivity of the disk surface 16 directly below the emitting area of the laser. The variation in voltage across the diode produced by the optical pattern is a function of the deviation from centering on the desired track.

The optical path from the laser chip 21 to the surface 16 is kept simple. The chip 21 is mounted directly on the magnetic recording head slider 7 and is flown over the disk surface at a height of about 0.25 to 1000 micrometers. The light reflected from the surface 16 of disk 9 re-enters the diode 21 directly.

FIG. 5.2 shows a laser diode 21 located a distance d above the surface 16 of magnetic recording disk 9. The variation of the voltage across the leads of the diode 21 are shown in FIG. 5.3 with the maximum voltage variation or amplitude declining as d increases along the dotted line which shows the envelope of the upper limit of the voltage. It is shown by the solid lines that the amplitudes of the voltages fluctuate as the optical path length increases to provide wave additive and subtractive effects with a periodicity of one half the optical wavelength. However, beyond a distance on the order of 75 micrometers, the variation stabilizes at peak voltage variation of about 1 mv. The data was collected for a medium with a surface composed of reflecting aluminum, using a GaAlAs injection double heterostructure laser operating at 860 nm. The precise frequency of the laser may vary but the operation of this invention is invariant with respect to minor variations in frequency. The voltage across the diode for a given current supplied thereto from a power supply is modulated by the retro-reflected light from the surface 16 of the disk 9 with a larger voltage where there is a mirrored area on surface 16 designated by the curve marked M on FIG. 5.4 and the voltage is less in FIG. 5.4 where there is a non-mirrored NM area on the surface 16. Thus, by providing alternatingly high and low reflectivity areas on the surface 16, with constant current i in FIG. 5.4, the voltage $\Delta V$ can be produced at the output of the diode 21. By producing outputs of varying frequencies as a function of track location of the head 21 on disk 9, due to the variation in the rate of change of voltage by mirrored and non-mirrored areas, the alignment of the head on the disk can be detected.

FIGS. 6.1-6.3 show configurations of servo tracks with markings on either side of a magnetic recording track which will produce a fundamental frequency of fluctuation in the voltage across the laser when the head is off center when passing over a track. When the head is centered on the track, the markings are detected equally on the sides of the track so that the modulation of the voltage contains only a second harmonic component and no first harmonic.

FIG. 15 shows an alternative embodiment of the laser feedback detector in which a diode optical detector is placed at the back facet of the semiconductor laser. Light from the back facet of the laser, as detected by the diode, is modulated by the reflectivity of the magnetic disk 9, as seen by the beam from the front facet of the laser. The laser diode 21 is driven by a constant current, while the light reflected back into the laser cavity by the disk surface 16 changes the lasing conditions within the diode 21. The reflected light can either increase or decrease the laser light emission, depending upon the phase of the returned wave. This change in emission is detected by measuring light from the rear facet by a detector diode 41. The spatial resolution of this configuration is high, even though no optical focusing elements are employed. Because only light reflected from near the center of the spot on the disk surface 16 is reflected back into the laser cavity. The detectors in the configurations of FIG. 5.1 and 15 attain a high spatial resolution for the detection of fine servo patterns without the necessity of focusing or adjusting complex optical elements.

FIG. 6.1 shows a track OT-1 for the optical transducer 21 which is a servo track on the disk 9. In this case the track is a continuous groove, which undulates from side to side across the magnetic recording, reading track MT in the magnetic medium 12. FIG. 6.1 shows the markings of the servo track OT-1 moving from side to side across the magnetic track MT. FIG. 5.2 shows spots OT-2 alternating on opposite sides of the track MT. FIG. 6.3 shows a square wave of segments OT-3 on either side of track MT.

The constant variation in the reflection of light produced by tracks OT-1 to OT-3 causes optical feedback variations in laser diode 21 which modulates the voltage across the diode 21. If the diode is centered on the track MT, then the voltage of the diode 21 will fluctuate at the second harmonic frequency which will produce no output from the position detection system. The output is so low because the phase detector rejects the second harmonic signal.

When, on the other hand, the diode 21 is off center relative to track MT, the frequency of reflection modulation by the optical markings is at half the frequency that is received on the track MT and so the filters permit the lower frequency signals to pass through so that there will be a large output signal from the phase-detector circuit 37.

FIG. 7 shows a circuit used to read the diode 21 as it reads the servo track data OT-n on the surface 16 of disk 9. The body of the diode 22 surrounds the laser optical channel 23. The body of the diode is connected to wire 26 at spot 24 whereas channel 23 is connected at point 25 to wire 28. Wire 26 is the grounded coaxial shield for the wire 28 in coaxial cable 27 which connects to node D. Power is supplied from source V through resistor 29, through node D, and through wire 28 to the diode 21. The signal supplied to node D passes through a high pass amplifier system including input blocking 30 capacitor C, feedback resistor R 33, feedback capacitor $C_f$39, and amplifier 32 with the capacitor located between input nodes D and E and the amplifier 32, the resistor R, and capacitor $C_f$39 connected in parallel with each other between nodes E and F. The capacitor C 30 serves to block all D.C. signals. The time constant $RC_f$ of the resistor R 33 and the blocking capacitor $C_f$39 will be sufficient to provide a response $R_{DF}$ shown in FIG. 8 with the response rising to a cut off frequency $f_c$ which is below the frequency produced by any of the patterns in FIGS. 6.1-6.3 assuming the disk is rotating at a predetermined angular velocity. Thus the variations in output by diode 21 caused by the pattern on the disk pass from node D to node F, but the low frequency noise is eliminated. The output from node F is passed through a relatively low frequency band pass filter 35 which is at the fundamental frequency $f_o$ of the patterns when the head is off track MT so that when the head is on track MT, the higher frequency ($2f_o$) signal produced will be filtered out by the filter 35 as shown by the response across nodes FG in FIG. 9. The result is that an output is received at node G when the head is off track MT, but a lower output will be produced in the event that the head is on the servo track MT. A phase detector 37 detects the phase and amplitude of the fundamental signal, from which is deduced the magnitude and direction of any deviation from the center of the desired track MT.

FIG. 10.1 shows a set of tracks a laser beam indicated by the shaded circle LB could follow which are labelled "1", "2" and "3". FIG. 10.2 shows corresponding signals $S_1$, $S_2$, and $S_3$ which indicate that if the beam LB follows track "1", maxima of voltage are produced below the $SP_1$ spots on the meduim whereas the maxima of voltage on track "3" are produced below the spots $SP_2$ which are half way between spots $SP_1$ and vice versa. The response signal $S_2$ for track "2" is seen to peak below each of the spots $SP_1$ and $SP_2$ with a very small amplitude, as the beam reflection will be reduced to a far lesser extent since the percentage of the beam which is reflected and fed back to the lasing diode is increased.

FIG. 11 shows a set of signals supplied to and produced by phase detector 37 which receives a signal such as $S_1$ as shown in FIG. 10.2. The sign of the signal is changed on alternate half cycles of the system. The beginning of a cycle is indicated by each of the vertical lines on the chart in FIG. 11. As can be seen by inspection of $S°_1$, the average voltage $\overline{S°}_1$ is positive when the laser detector follows the path 1. Of course the average $\overline{S°}_3$ would be just the opposite for path 3.

FIG. 12 shows the relationship between the average values of $S°_1$ and track position. For track "1", the value is positive, while on the track "2" (MT), the value is zero and for track "3", the value is negative.

FIG. 13.1 shows an array of tracks and spots of the variety shown in FIG. 10.1 with additional spots $SP_3$ and $SP_4$ added to the structure shown and tracks N and N−1 shown.

FIG. 13.2 shows the average signal $\overline{S°}$ from the phase detector varying with slopes in opposite directions for adjacent tracks so that the signal can indicate in which direction the change is going relative to the track upon which the measurement started.

FIGS. 14.1 and 14.2 show scanning electron micrographs of parallel arrays of laser written spots formed on the medium of FIG. 1 for varying power levels as indicated of 13, 16, 20, 23, 26 and 30 mw for exposures of 40 and 100 ns. The optimum power level appears to be 13 mw at 40 ns. At lower power levels with a 40 ns pulse width, silicide spots are formed with a power level lower than 16 mw, whereas hole formation takes place at higher power levels.

FIG. 16.1 shows an arrangement of the type shown in FIG. 15 with the semiconductor chip 17 incorporating the laser diode 21 and the detector 41 aligned so that the detector 41 can measure the laser energy from laser 21.

In an alternative embodiment in FIG. 16.2, the laser diode 21 is formed on the chip 17' and the detector 41 is formed on an adjacent chip 17''. The point is that both chips or a single chip can be employed to embody the device as described in connection with FIG. 15.

Having thus described our invention, what we claim as new, and desire to secure by Letters Patent is:

1. A system including
   a magnetic recording disk carrying a magnetic recording disk medium and means for reading said magnetic recording disk medium,
   said medium carrying a layer of magnetic material and including a servo track layer separate from the magnetic material which is encoded with servo information which is read optically by an optical laser transducer which is modulated in its operating characteristics in response to optical reflectivity variations of the surface of said medium,
   said servo track layer being deposited above said magnetic material,
   a slider means for carrying a magnetic recording head and said optical laser transducer, said slider being adapted for aerodynamic suspension over said medium,
   said optical laser transducer being carried by said slider which directs a laser beam towards said servo information on said medium,
   said disk medium including a reflector for said laser beam, said reflector comprising said servo track layer of said medium with spots thereon forming servo tracks and said spots carrying said servo information,
   said reflector reflecting said beam towards said optical laser transducer, said servo information being read optically by said optical laser transducer which is modulated in its operating characteristics in response to optical reflectivity variations of the surface of said medium, said variations affecting the lasing functions of said optical laser transducer producing fluctuations in the operating characteristics of said optical laser transducer,
   said servo information including a pattern of servo indicia serving to modulate optical feedback from said reflector,
   said optical laser transducer being mounted on a slider spaced from said medium by less than about 1000 micrometers,
   said optical laser transducer being adapted to receive retro-reflective light directly from said medium without the assistance of optical elements such as lenses,
   said optical laser transducer including a back facet, an optical sensor being juxtaposed with said back facet of said optical laser transducer to sense the modulation of operation of said optical laser transducer.
   whereby said servo information interacts with said medium employing variations in the optical characteristics of said medium to modulate the operation of said laser as a function of said reflectivity, and
   said optical sensor detects said modulation.

2. A system in accordance with claim 1 wherein
   an optical sensor is juxtaposed with said optical laser transducer to sense the modulation of the operation of said optical laser transducer.

3. A system including a magnetic recording disk carrying a magnetic recording disk medium and means for reading said magnetic recording disk medium,
   said medium carrying a layer of magentic material and including a servo track layer separate from said magnetic material,
   said servo track layer being deposited above said magnetic material, said servo track layer being encoded with servo information,
   means for reading said servo information optically with a laser comprising an optical transducer which is modulated in its operating characteristics in response to optical reflectivity variations in the surface of said servo track layer in said medium a slider carrying a magnetic recording head, said slider being adapted for aerodynamic suspension over said medium, said laser being carried by said slider, and said laser directing a laser beam towards said servo information on said medium, said laser including electrical terminals adapted to be connected to a source of power for said laser, said medium including a reflector, said reflector comprising said said servo track layer in said medium with spots thereon forming servo tracks and said spots carrying said servo information, said reflector reflecting said beam towards said laser affecting the lasing function of said laser, producing fluctuations in the voltage of said laser, said servo information including a pattern of servo indicia serving to modulate optical feedback from said reflector, said servo information interacting with said medium employing variations in the optical characteristics of said medium to modulate the operation of said laser as a function of said reflectivity, wherein said laser, comprises a semiconductor diode injection laser which directs light from a laser towards said medium, said laser being mounted on a slider spaced from said medium by from about 0.25 micrometers to about 1000 micrometers, said laser being adapted to receive retro-reflective light from said medium, without the assistance of refractive optical elements such as lenses, said laser having an output voltage varying as a function of the quantity of retro-reflected light received from said medium as a function of time, and said laser having said terminals connected to an electrical output circuit connected to a means for detecting the variations in output signal from said laser.

4. A system including a magnetic recording disk carrying a magnetic recording disk medium and means for reading said magnetic recording disk medium, said medium carrying a layer of magnetic material and including a servo track layer separate from said magnetic material, said servo track layer being deposited above said magnetic material, said servo track layer being encoded with servo information, means for reading said servo information optically with an optical laser transducer which is modulated in its operating characteristics in response to optical reflectivity variations in the surface of said medium and a slider carrying a magnetic recording head, said slider being adapted for aerodynamic suspension over said medium, said optical laser transducer being carried by said slider which directs a laser beam towards said servo information on said medium, said disk including a reflector, said reflector comprising said medium with spots thereon forming servo tracks and said spots carrying said servo information, said reflector reflecting said beam towards said optical laser transducer affecting the lasing function of said optical laser transducer, producing fluctuations in the operating characteristics of said optical laser transducer, said servo information including a pattern of servo indicia serving to modulate optical feedback from said reflector, said servo information interacting with said medium employing variations in the optical characteristics of said medium to modulate the operation of said optical laser transducer as a function of said reflectivity, said optical laser transducer being mounted on a slider spaced from said medium by between about 0.25 micrometers and 1,000 micrometers, and said optical laser transducer being adapted to receive retro-reflective light directly from said medium, without the assistance of optical elements such as lenses, and said medium being encoded with an optical servo track with alternating indicia on opposite sides of a track of the magnetic recording data whereby the frequency of modulation of said laser by said optical characteristics of said medium is minimal when said optical laser transducer is on the track of said magnetic recording data and said frequency is increased substantially when said optical laser transducer moves off the track of said magnetic recording data.

5. A system in accordance with claim 4 wherein said system includes means for filtering out the electrical response of said optical laser transducer so that an output rises to the higher frequencies associated with the optical laser transducer being off the track of the magnetic recording data.

6. A system including a magnetic recording disk carrying a magnetic recording disk medium and means for reading said magnetic recording disk medium, said medium carrying a layer of magnetic material and including a servo track layer separate from the magnetic material which is encoded with servo information which is read optically by an optical laser transducer which modulates its operating characteristics in response to optical reflectivity variations of the surface of said medium and, a slider means for carrying a magnetic recording head and said optical laser transducer, said optical laser transducer, being carried by said slider which directs a laser beam towards said servo information on said medium, said disk medium including a reflector for said optical laser transducer, said reflector comprising said medium with spots thereon forming servo tracks and said spots carrying said servo information, said reflector reflecting said beam towards said optical laser transducer, said servo information being read optically by said optical laser transducer which is modulated in its operating characteristics in response to optical reflectivity variations of the surface of said medium, said variations affecting the lasing function of said optical laser transducer producing fluctuations in the operating characteristics of said optical laser transducer, said servo information including a pattern of servo indicia serving to modulate optical feedback from said reflector, said optical laser transducer being mounted on a slider spaced from said medium by less than about 1000 micrometers, said optical laser transducer being adapted to receive retro-reflective light directly from said medium without the assistance of optical elements such as lenses, said optical laser transducer including a back facet, an optical sensor being juxtaposed with said back facet of said optical laser transducer apparatus to sense the modulation of operation of said optical laser transducer, whereby said servo information interacts with said medium employing variations in the optical characteristics of said medium to modulate the operation of said optical laser transducer as a function of said reflectivity, said optical sensor detects said modulation, and said servo track layer includes a layer of rhodium coated with a top layer of a dielectric material.

7. A system in accordance with claim 6 wherein said dielectric material comprises amorphous silicon.

8. A system in accordance with claim 6 wherein said layer of rhodium is on the order of 25-250 nm thick and said dielectric material is an amorphous material comprising a layer of silicon about 10 to 50 nm thick, said optical laser transducer comprises a GaAlAs diode laser with a wavelength on the order of 820 nm, and an output circuit of said optical laser transducer is connected to a filter circuit which will pass signals from said optical laser transducer when servo track signals generated in said laser are within a predetermined range of frequencies.

* * * * *